C. B. TRESCOTT.
PROCESS OF CURING MEAT.
APPLICATION FILED SEPT. 19, 1911.
1,016,656.
Patented Feb. 6, 1912.
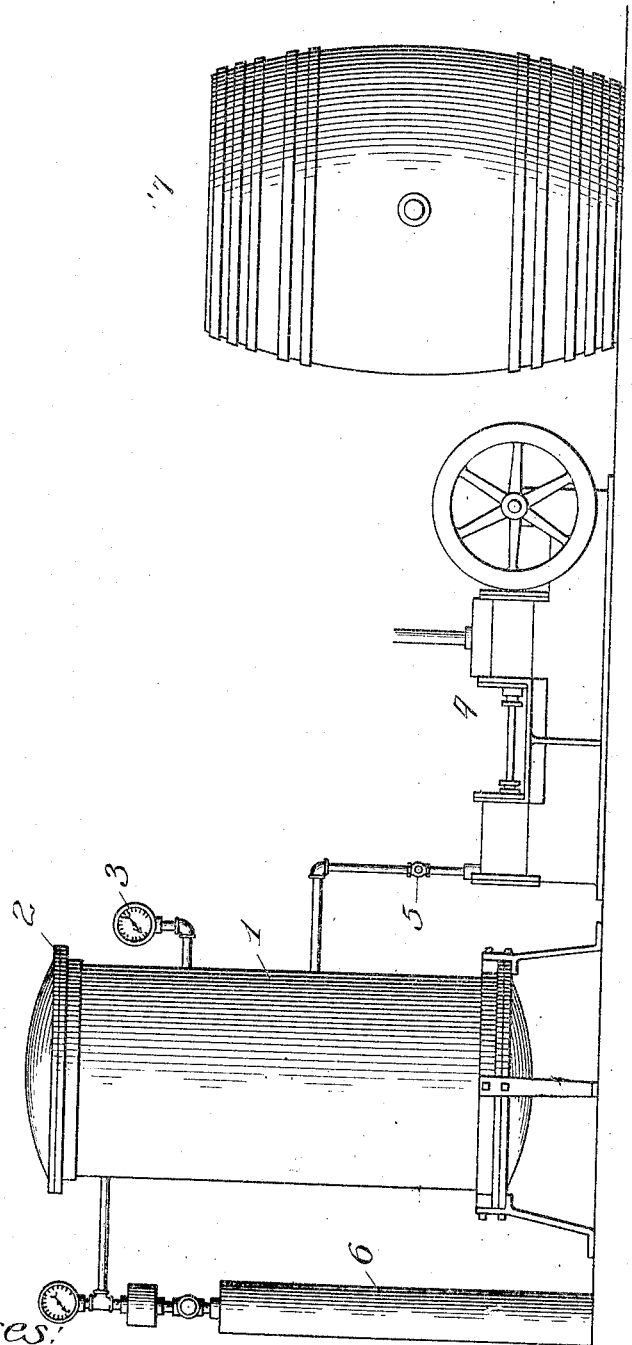

UNITED STATES PATENT OFFICE.

CHARLES B. TRESCOTT, OF INDIANAPOLIS, INDIANA, ASSIGNOR OF ONE-HALF TO JOSEPH ALLERDICE, OF INDIANAPOLIS, INDIANA.

PROCESS OF CURING MEAT.

1,016,656.  Specification of Letters Patent.  Patented Feb. 6, 1912.

Application filed September 19, 1911. Serial No. 650,081.

*To all whom it may concern:*

Be it known that I, CHARLES B. TRESCOTT, a citizen of the United States, residing at Indianapolis, in the county of Marion and State of Indiana, have invented a new and useful Improvement in the Process of Curing Meat, of which the following is a specification.

My invention relates to an improvement in the art of preserving meats by treating them with salt; and while I have devised my improved process more especially for pork (hams and bacon) and beef, it is equally applicable to fish and other meats.

For the sake of brevity, the following description of my invention relates more particularly to its application to hams and bacon, with reference to the accompanying drawing:

The accompanying drawing illustrates, by way of a diagrammatic representation, apparatus in side elevation suitable for the practice of my improved process.

The apparatus shown in the drawing comprise a tank 1, provided with a removable cover 2, adapted to be hermetically sealed, and equipped with a pressure-gage 3; a suitable pump 4 adapted to exhaust the air from the tank to establish a vacuum therein and equipped with a valve 5 for opening and closing the communication; means for controllably supplying carbonic acid gas to the tank, shown as a gage-equipped drum 6, for holding liquefied carbonic acid gas, communicating with the tank near its upper end; and a barrel or tierce 7 as a receptacle for the meat to be cured in brine.

The more general demand of consumers of cured meats is for a mild degree of saltness. Packers aim to meet this demand, but suffer, in consequence, serious losses due to tainting of the meats because of the lesser quantity of salt used, which is insufficient for its required preservative effect; so that, in this way (and the milder the curing, the greater the ensuing loss), it is not uncommon for a packer to sacrifice 3 to 4 per cent. of his entire product of mildly-cured meats, the loss, however, falling upon the consumer by the increase to him in the cost of the article.

The primary object of my invention is to render the keeping quality of meats cured by mild salting at least equal to or even greater than that of meats that are treated with the maximum quantity of salt, which is about 80 per cent. of the salt in a saturated solution, when brine is used for the pickling or curing purpose; and by my process, furthermore, the curing is greatly expedited, in the matter of time, requiring only about one-half the time required for curing in the ordinary way and under the low temperatures employed in the latter, while with the employment of higher temperatures the time may be still further and greatly reduced.

To practice my invention, the air contained in the fresh meat to be cured is withdrawn from it and supplanted by carbonic acid gas, for the well-known preservative action of the latter. These steps may be best and most expeditiously and thoroughly performed by hermetically confining the meat to be treated in the tank 1 and working the pump to exhaust the air therefrom and withdraw the air contained in the meat, until a strong vacuum, say of about 26 inches, is attained in the tank. This may take about twenty minutes. Upon then closing communication of the pump with the tank, the drum 6 is opened to the latter, thereby admitting into it carbonic acid gas, preferably at a pressure of about 60 pounds to the square inch. Within a few hours, say 3 to 4, the carbonic acid gas thoroughly permeates the contents of the tank, supplanting in the meat the air withdrawn from it. In this gas-impregnated condition of the meat, it is, obviously, thoroughly sterilized; and it remains so until it is eventually cooked, since it retains the carbonic acid gas until driven out by the heat of cooking. The meat, thus sterilized, is then removed from the tank, after shutting off the supply thereto of the gas, and is introduced into a barrel or tierce 7 prepared with a supply of weak brine containing no more, necessarily, than 40 to 50 per cent. of the salt in a saturated solution, with the usual quantity of saltpeter, if desired, for the curing purpose.

The best results are obtained by keeping the tierce under the usual low temperature, which is below that at which fermentation would develop, namely about 40° F. The condition of the meat produced by its treatment with the carbonic acid gas does not require any preservative action upon it, of the salt, but merely the flavoring and coloring effects of the latter, which thus renders the relatively small quantity thereof above mentioned all that is necessary, since the mildly salted meat, when preparatorily treated with the carbonic acid gas, remains unsusceptible to tainting or decomposition. I find that, at the temperature stated, the curing is accomplished in about one-half the time that is required for curing in the ordinary manner, the condition of the meat appearing to render it much more permeable by the salt; and where the temperature employed is higher the curing is completed more rapidly. Thus, at 80° F. to 90° F., which temperatures I have employed in the practice of my process, the meat cures in about one-fifth the time required for curing it in the ordinary way; but the permeating action of the salt is then so rapid that it is liable, even in the weak solution referred to, to produce excessive saltness in the meat, so that it is not so desirable to employ a higher temperature than 40° F. to 50° F., or thereabout, in which to conduct the curing in the comparatively weak brine. However, the saving of one-half the time for curing is productive of vast advantage in the way of economy in time, fuel, storage and interest, and rendering the market for the meat more stable and the article more merchandizable, by removing from it the speculative element in the fluctuation of price due to having to carry it for long periods.

What I claim as new, and desire to secure by Letters Patent, is—

1. The process of curing meat for the purpose set forth, which consists in driving out its contained air and supplanting such air with carbonic acid gas, and subjecting the meat so treated to the action of salt.

2. The process of curing meat for the purpose set forth, which consists in driving out its contained air and supplanting such air with carbonic acid gas, and subjecting the meat so treated to the action of relatively-weak brine.

3. The process of curing meat for the purpose set forth, which consists in confining it against the access of air, pumping out the air in and about the meat supplanting said air with carbonic acid gas, and subjecting the meat so treated to the action of salt.

4. The process of curing meat for the purpose set forth, which consists in confining it against the access of air, pumping out the air in and about the meat supplanting said air with carbonic acid gas, transferring the meat so treated into a relatively-weak brine, and maintaining the brine under subjection to a temperature above that which promotes fermentation (about 40° F.) until the meat is cured.

CHARLES B. TRESCOTT.

In presence of—
RALPH SCHAEFER,
JOHN WILSON.